United States Patent [19]

Anders

[11] Patent Number: 4,969,569
[45] Date of Patent: Nov. 13, 1990

[54] DISPOSABLE PAN WITH RETRACTABLE LEG-SUPPORTS

[75] Inventor: Gary P. Anders, Highland Park, Ill.

[73] Assignee: Industrial Precision Products, Schaumburg, Ill.

[21] Appl. No.: 468,189

[22] Filed: Jan. 22, 1990

[51] Int. Cl.$^5$ .............................................. B65D 5/46
[52] U.S. Cl. ...................................... 220/69; 220/95; 220/71
[58] Field of Search ................... 220/69, 71, 85 H, 95, 220/19, 94 R

[56] References Cited

U.S. PATENT DOCUMENTS

| | | | |
|---|---|---|---|
| 971,060 | 9/1910 | Lynch | 220/69 X |
| 2,983,402 | 5/1961 | Gottsegen | 220/95 X |
| 3,194,429 | 7/1965 | Bouet | 220/95 X |
| 4,717,038 | 1/1988 | Anders | 220/95 X |

4,852,760  8/1989  Sarnoff et al. .................... 220/85 H

*Primary Examiner*—Steven M. Pollard
*Attorney, Agent, or Firm*—Gerstman & Ellis, Ltd.

[57] ABSTRACT

A disposable oven pan is formed of stamped aluminum sheet material having a bottom, side walls and a rim at the periphery of the side walls. A pair of handles are fastened to the rim at opposed locations. Stabilizing bars bridge the connection points of each handle. A pair of support-legs extend from below the handle connection points, adjacent the outside of the side walls and under the bottom of the pan for providing structural support to the pan and for providing legs to raise the pan above a table so that heat can be applied to the bottom of the pan to keep the food contained therein warm. The handles, stabilizing bars and support-legs are formed of steel, enabling the aluminum sheet to be relatively thin yet supportive of relatively heavy loads.

15 Claims, 1 Drawing Sheet

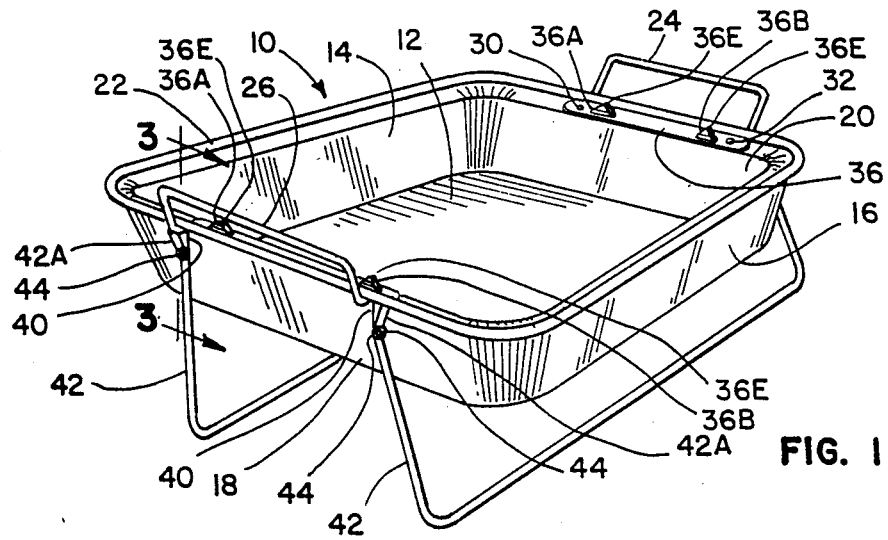
FIG. 1
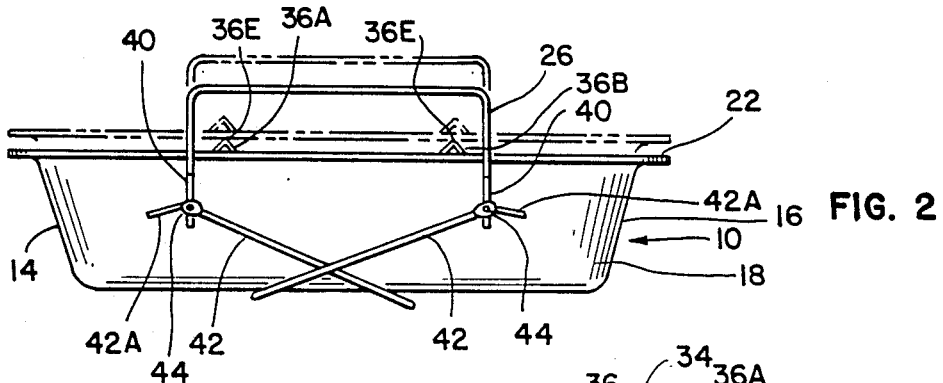
FIG. 2
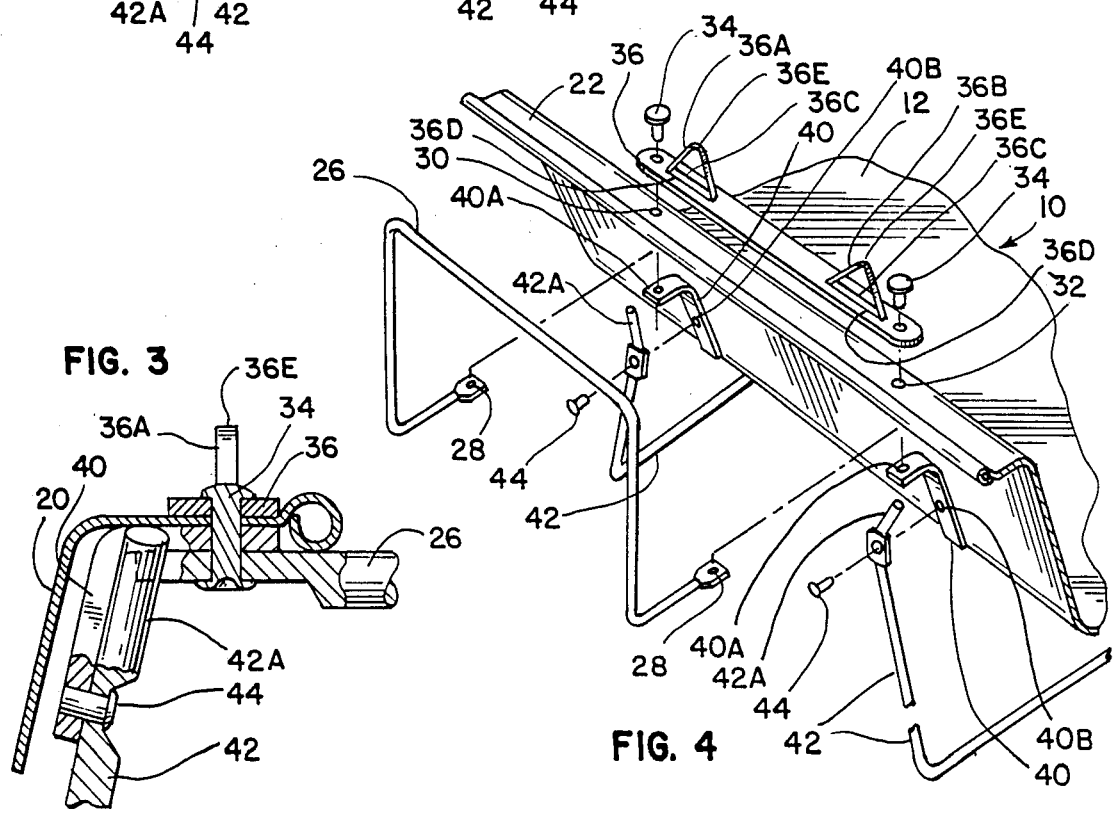
FIG. 3
FIG. 4

DISPOSABLE PAN WITH RETRACTABLE LEG-SUPPORTS

FIELD OF THE INVENTION

The present invention concerns a novel disposable pan.

BACKGROUND OF THE INVENTION

Prior art disposable pans, formed of stamped aluminum sheet, are widely used today. Conventionally the aluminum is 0.0065 inch in thickness and such pans come in a variety of shapes, often rectilinear with two ends and two sides, or curvilinear with a generally elliptical shape.

The disposable pans used for baking or broiling poultry, for example, may be formed of 0.0065 inch thick stamped aluminum sheet and may be suitable for supporting 20 pounds. The rectilinear pans have the problem of bending when they are lifted, sometimes causing the hot juices to spill over. Typically the pans are lifted from underneath, and well-insulated gloves are required in order to prevent burns. Even well insulated-gloves may be difficult to use because of high heat conditions of the disposable pan and the bending problem.

In Anders U.S. Pat. No. 4,717,038, the problems described above are alleviated by providing handles and reinforcement of the underside of the pan, thus allowing the use of thinner aluminum while providing a great deal more stability than prior art disposable pans. The reinforced disposable pan, however, still made it desirable to use a different receptacle for serving and keeping food warm after the food is cooked in the disposable pan. I have discovered a novel disposable pan which provides stability equal to that of the pan disclosed in U.S. Pat. No. 4,717,038, while also providing legs to raise the pan to a comfortable serving level and to allow the placement of chemical or electric warming means beneath the pan. Food can then be served from the pan and may be kept warm for extended periods of time. Because the pan is made of stamped aluminum, a metal substantially thinner than the steel usually used in a heated serving arrangement, food can be kept warm with relatively less energy.

It is therefore an object of the present invention to provide a disposable pan that is sturdy in construction, convenient to serve food from, and is economical to manufacture.

Another object of the present invention is to provide means from which to serve food that will use fuel economically.

Other objects and advantages of the present invention will become apparent as the description proceeds.

SUMMARY OF THE INVENTION

In accordance with the present invention, an oven pan is provided which comprises a disposable stamped aluminum pan structure having a bottom, side walls, and a rim at the periphery of the side walls.

A first support-leg and a second support-leg are each pivotally coupled to the aluminum pan on corresponding parts of the aluminum pan, such that when the support-legs are pivoted-up they cross over each other and lie adjacent to the bottom of the aluminum pan to provide stability. When the support legs are pivoted-down the aluminum pan can be supported above a surface to allow for the placement of warming means beneath the aluminum pan.

In the illustrative embodiment, handles are provided to assist in the lifting of the pan from the oven. Stabilizing means, comprised of thin bars of cold rolled steel having thin sections punched-up through the steel, are used to provide added stability to the rim of the aluminum pan and to provide separation of pans when one pan is placed inside of another for storage or display.

In the illustrative embodiment, a plurality of generally L-shape connector bars are provided. Each L-shaped connector is attached at the short leg of the L to an end of a handle and then extended downward so that the long leg of the L is pivotally attached to one of the two support-legs. The support-legs are thus coupled to corresponding sides of both handles.

In the illustrative embodiment, the support legs, formed of cold rolled steel and having a circular cross section, are generally U-shape and are of such length as to span the length of the disposable pan and provide a clearance, from a table top to the bottom of the pan, of several inches.

BRIEF DESCRIPTION OF THE DRAWINGS

FIG. 1 is a perspective view of a disposable oven pan, constructed in accordance with the principles of the present invention;

FIG. 2 is a side view of two disposable pans, one stacked within the other, constructed in accordance with the principles of the present invention;

FIG. 3 is an enlarged cross-sectional view, taken along the plane of the line 3—3 of FIG. 1; and FIG. 4 is an exploded view of one side of the pan of FIG. 1.

DETAILED DESCRIPTION OF THE ILLUSTRATIVE EMBODIMENT

Referring to the drawings, an oven pan 10 is illustrated therein, having a bottom 12, side walls comprising opposed end walls 14, 16 and opposed sides 18 and 20. A peripheral rim 22 is provided and the pan with its bottom, end walls, sides and rim is formed from a unitary sheet of stamped aluminum, having a thickness between 0.003 inch and 0.008 inch, preferably 0.004 inch.

A pair of handles 24, 26, formed of cold rolled steel, are fastened to the sides of the pan 10. The handles are generally U-shaped, with the ends of the U 28 being fastened at two spaced points 30, 32 on the rim 22, preferably by rivets 34. Other fastening means than rivets could be used if desired, including crimping or adhesives.

The two spaced points 30 and 32 are bridged by stabilizing means comprised of elongated bars 36 formed of cold rolled steel. Each elongated bar 36 has two or more triangularly shaped punch-outs 36A and 36B. The punch-outs 36A and 36B, formed by mechanically cutting along two lines 36C and 36D and exerting force at the center 36E, allow stacking of disposable pans in such a way as to allow easy removal of one pan at a time, making storage and display more convenient. Punch-outs 36A and 36B could be pre-formed and attached to the stabilizing bars 36 by suitable attaching means.

Connector bars 40 are provided to facilitate the attachment of support means to the pan structure. The connector bars 40 are generally L-shaped and formed of cold rolled steel. They are attached, beneath the rim 22, simultaneously with the handles 26 using the rivets 34. The connector bars 40 are attached to the rim at the points 40A, on the short leg of the connector bars 40 where an opening is provided, and bars 40 lie adjacent to the pan 10. Points 40B are provided for the pivotal connection of leg supports 42 to the connector bars 40. Leg supports 42 are connected by rivets 44 to the connector bars 40 at the points 40B where an opening is provided. The frictional resistance provided by rivets 44 allows the support legs to be placed in a first positions, as shown in FIG. 2, without the need for locking means, while allowing for the rotation of the legs to a second position which will be explained below.

Leg supports 42 are generally U-shaped and have small legs 42A, adjacent the points 46, bent to an acute angle. The small legs 42A provide means to stop the rotation of the support legs 42 at a desirable point. When the rotation of the small legs 42A is complete, the leg supports 42 will be in the second position, as shown in FIG. 1, allowing the pan 10 to be supported above a surface.

A pan and support structure constructed as described above will have the ability to support food, as the pan 10 is removed from an oven, when the support-legs 42 are pivoted such that they cross-over one another and lie adjacent to the bottom 12 of the pan 10. A pan and support structure constructed as described above will also have the ability to support foods above a surface, when the support legs 42 are pivoted down until the small legs 42A have rotated as far as possible, so that means to keep the food warm can be placed on the surface beneath the bottom 12 of the pan 10.

Although an illustrative embodiment of the invention has been shown and described, it is to be understood that various modifications and substitutions may be made by those skilled in the art without departing from the novel spirit of the present invention.

What is claimed is:

1. An oven pan which comprises:
   a disposable stamped aluminum pan structure having a bottom, side walls and a rim at the periphery of the side walls;
   a first support-leg and a second support-leg each pivotally coupled to said aluminum pan, on corresponding parts of two opposed side walls of said aluminum pan, such that when said support-legs are pivoted-up the legs cross over each other and lie adjacent to the bottom of said aluminum pan to provide stability when said aluminum pan is lifted, and when said support-legs are pivoted-down said aluminum pan can be supported above a surface to allow for the placement of warming means beneath said aluminum pan.

2. An oven pan as described in claim 1, said stamped aluminum having a thickness of between 0.003 inch and 0.008 inch.

3. An oven pan as described in claim 1, said pan having a rectilinear configuration with said side walls forming two ends and two sides.

4. An oven pan as described in claim 1, said pan having a curvilinear configuration with said side walls forming a continuous, endless curve.

5. An oven pan as described in claim 1, in which said support-legs are formed of steel and have a circular cross-sectional configuration.

6. An oven pan which comprises:
   a disposable stamped aluminum pan structure having a bottom, side walls and a rim at the periphery of the side walls, said stamped aluminum having a thickness of between 0.003 inch and 0.008 inch;
   a first support-leg and a second support-leg each pivotally coupled on corresponding parts of said rim adjacent to opposed side walls of said aluminum pan such that when said support-legs are pivoted-up the legs cross over each other and lie adjacent to the bottom of said aluminum pan to provide stability when said aluminum pan is lifted, and when said support-legs are pivoted-down said aluminum pan can be supported above a surface to allow for the placement of warming means beneath said aluminum pan.

7. An oven pan which comprises:
   a disposable stamped aluminum pan structure having a bottom, side walls and a rim at the periphery of the side walls, said stamped aluminum having a thickness of between 0.003 inch and 0.008 inch;
   a first handle fastened to the rim at a first location thereof;
   first means fastening said first handle to the rim;
   a second handle fastened to the rim at a second location thereof, opposed to said first location;
   second means fastening said second handle to the rim;
   a plurality of connector bars attached one at each point of connection of said first handle and said second handle and extending below said rim; and
   a first support-leg and a second support-leg each pivotally connected to two of said connector bars at corresponding ends of said first handle and said second handle, such that when said support-legs are pivoted-up, the support-legs cross over each other and lie adjacent to the bottom of said aluminum pan to provide stability when said aluminum pan is lifted, and when said support-legs are pivoted-down said aluminum pan can be supported above a surface to allow for the placement of warming means beneath said aluminum pan.

8. An oven pan as described in claim 7, in which each of said handles has a generally U-shape with said fastening means and said connector bars being connected to the ends of said U.

9. An oven pan as described in claim 7, in which said fastening means comprises rivets.

10. An oven pan as described in claim 7, in which said fastening means comprises crimping.

11. An oven pan as described in claim 7, in which said fastening means comprises adhesive.

12. An oven pan as described in claim 7, in which said connector bars are generally L-shape and are formed of steel.

13. An oven pan as described in claim 7, in which a stabilizing bar, comprised of an elongated bar, formed of steel and having thin triangularly shaped sections carried on said bar, is attached within the points of connection of said first and second handles, to provide additional support for said rim when said pan is lifted and to aid in the separation of pans when one pan is placed inside of another for storage or display.

14. An oven pan, which comprises:
   a disposable stamped aluminum pan structure having a bottom, side walls and a rim at the periphery of the side walls, said stamped aluminum having a thickness of between 0.003 inch and 0.008 inch;
   a first handle having a generally U-shape and fastened to the rim at a first location thereof;
   first means fastening said first handle at the ends of the U to the rim;

a second handle having a generally U-shape and fastened to the rim at a second location thereof, opposed to said first location;
second means fastening said second handle at the ends of the U to the rim;
a first support-leg and a second support-leg each pivotally coupled to corresponding ends of said first handle and said second handle, such that when said support-legs are pivoted-up the support-legs cross over each other and lie adjacent to the bottom of said aluminum pan to provide stability when said aluminum pan is lifted, and when said support-legs are pivoted-down said aluminum pan is supported above a surface to allow for the placement of warming means beneath said aluminum pan.

15. An oven pan, which comprises:
a disposable stamped aluminum pan structure having a bottom, side walls and a rim at the periphery of the side walls, said stamped aluminum having a thickness of between 0.003 inch and 0.008 inch;
a first handle having a generally U-shape and fastened to the rim at a first location thereof;
first means fastening said first handle at the ends of the U at two spaced points on the rim;
first stabilizing means bridging said two spaced points;
a second handle having a generally U-shape and fastened to the rim at a second location thereof, opposed to said first location;
second means fastening said second handle at the ends of the U at two spaced points on the rim;
second stabilizing means bridging said last-mentioned two spaced points;
said first and second stabilizing means each comprising an elongated bar;
a plurality of connector bars attached one at each of said spaced points and extending below said rim; and
a first support-leg and a second support-leg each pivotally connected to two of said connector bars at corresponding ends of said first and second elongated bar, such that when said support-legs are pivoted-up, the support-legs cross over each other and lie adjacent to the bottom of said aluminum pan to provide stability when said aluminum pan is lifted, and when said support-legs are pivoted-down said aluminum pan is supported above a surface, by said support-legs, to allow for the placement of warming means beneath said aluminum pan.

* * * * *